(12) United States Patent
Eichner et al.

(10) Patent No.: US 12,440,177 B2
(45) Date of Patent: Oct. 14, 2025

(54) COMPUTED TOMOGRAPHY DEVICE AND METHOD FOR EXECUTING TRANSLATION MOVEMENTS OF GANTRY PARTS OF A COMPUTED TOMOGRAPHY DEVICE

(71) Applicant: Siemens Healthcare GmbH, Erlangen (DE)

(72) Inventors: Christoph Eichner, Erlangen (DE); Aurel Jensch, Eggolsheim (DE); Viktor Löwen, Sankt Augustin (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 120 days.

(21) Appl. No.: 18/478,742

(22) Filed: Sep. 29, 2023

(65) Prior Publication Data
US 2024/0108295 A1 Apr. 4, 2024

(30) Foreign Application Priority Data
Sep. 30, 2022 (EP) .................................... 22199104

(51) Int. Cl.
*A61B 6/03* (2006.01)
*A61B 6/00* (2024.01)

(52) U.S. Cl.
CPC ............ *A61B 6/035* (2013.01); *A61B 6/4405* (2013.01)

(58) Field of Classification Search
CPC ............................... A61B 6/035; A61B 6/4405
See application file for complete search history.

(56) References Cited

U.S. PATENT DOCUMENTS

| | | | | |
|---|---|---|---|---|
| 5,638,419 A | * | 6/1997 | Ingwersen | A61B 6/035 378/208 |
| 5,799,054 A | * | 8/1998 | Hum | A61B 6/4447 378/4 |
| 6,865,254 B2 | * | 3/2005 | Nafstadius | A61N 5/1081 378/65 |
| 6,959,068 B1 | * | 10/2005 | Sommer | A61B 6/04 378/208 |
| 7,564,945 B2 | * | 7/2009 | Kim | A61B 6/4447 378/65 |
| 2003/0235266 A1 | * | 12/2003 | Gregerson | A61N 5/1082 378/4 |
| 2004/0170254 A1 | * | 9/2004 | Gregerson | A61B 6/4405 378/197 |
| 2004/0228450 A1 | * | 11/2004 | Mueller | A61B 6/4488 378/199 |

(Continued)

FOREIGN PATENT DOCUMENTS

| | | |
|---|---|---|
| CN | 114098790 A | 3/2022 |
| CN | 114947922 A | 8/2022 |
| EP | 3342348 A1 | 7/2018 |

*Primary Examiner* — Blake C Riddick
(74) *Attorney, Agent, or Firm* — Harness, Dickey & Pierce, P.L.C.

(57) ABSTRACT

One or more example embodiments relates to a computed tomography device, having a gantry with a first gantry part, a second gantry part and a third gantry part, wherein the first gantry part includes a rotor with a projection data acquisition system and via a first linear guide is movably mounted relative to the second gantry part such that a translation movement of the first gantry part relative to the second gantry part can be executed, in particular can be executed along the first linear guide.

20 Claims, 9 Drawing Sheets

(56) References Cited

U.S. PATENT DOCUMENTS

| | | | | |
|---|---|---|---|---|
| 2014/0362969 A1* | 12/2014 | Hockersmith | ....... | G01N 23/046 378/4 |
| 2015/0094573 A1* | 4/2015 | Bouhnik | ................ | A61B 6/037 600/425 |
| 2015/0173696 A1* | 6/2015 | Zingerman | .............. | A61B 6/06 378/9 |
| 2016/0038100 A1* | 2/2016 | Nakanishi | ................ | A61B 6/10 378/209 |
| 2016/0128653 A1* | 5/2016 | Fortuna | .................. | A61B 6/035 378/15 |
| 2017/0238889 A1* | 8/2017 | Murch | ................. | A61B 6/4435 |
| 2017/0258428 A1* | 9/2017 | Distler | ................... | A61B 6/035 |
| 2017/0325763 A1* | 11/2017 | Hoernig | .............. | A61B 6/4417 |
| 2018/0008221 A1* | 1/2018 | Ito | .......................... | A61B 6/032 |
| 2020/0016927 A1* | 1/2020 | Dietrich | ................. | G05D 1/021 |
| 2020/0268332 A1* | 8/2020 | Gregerson | ........... | A61B 6/0407 |
| 2020/0367847 A1* | 11/2020 | Allmendinger | ....... | G06T 11/005 |
| 2020/0405256 A1* | 12/2020 | Dickmann | ........... | A61B 6/0407 |
| 2020/0408941 A1* | 12/2020 | Wu | ...................... | A61B 6/5235 |
| 2023/0355194 A1* | 11/2023 | Gregerson | ............. | A61B 6/035 |

\* cited by examiner

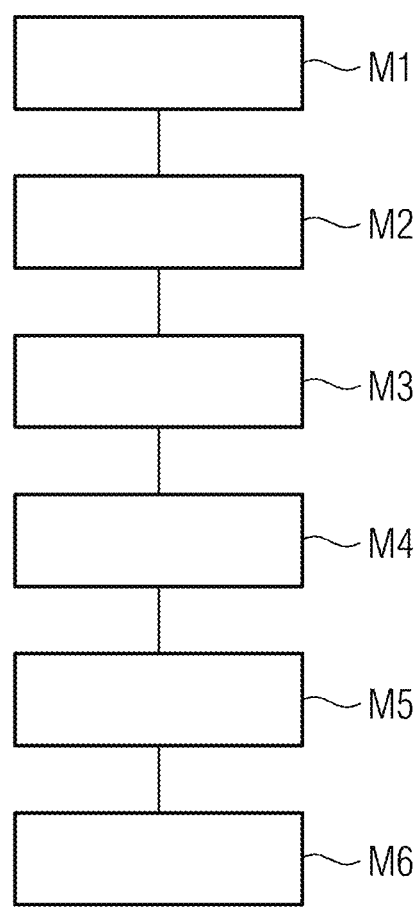

COMPUTED TOMOGRAPHY DEVICE AND METHOD FOR EXECUTING TRANSLATION MOVEMENTS OF GANTRY PARTS OF A COMPUTED TOMOGRAPHY DEVICE

CROSS-REFERENCE TO RELATED APPLICATION(S)

The present application claims priority under 35 U.S.C. § 119 to European Patent Application No. 22199104.5, filed Sep. 30, 2022, the entire contents of which are incorporated herein by reference.

FIELD

One or more example embodiments of the present invention relates to a computed tomography device. One or more example embodiments of the present invention further relates to a method for executing translation movements of gantry parts of a computed tomography device.

RELATED ART

In order to examine an object under examination with the aid of a computed tomography device, it is possible for example to perform a scanning movement. In this case the object under examination and a projection data acquisition system of the computed tomography device are moved in a translatory manner relative to one another, while projection data from an area under examination of the object under examination is captured via the projection data acquisition system, in particular in order to be able to generate a multi-slice medical image dataset.

In certain situations it may be advantageous if the scanning movement can be performed while the object under examination is at rest relative to a surrounding area of the computed tomography device, in particular relative to an examination room. For this, the projection data acquisition system of the computed tomography device is moved in a translatory manner relative to the surrounding area of the computed tomography device, while projection data from the area under examination of the object under examination is captured via the projection data acquisition system.

For example, for this a gantry part of the computed tomography device, said gantry part containing the projection data acquisition system, can be moved in a translatory manner relative to a gantry part of the computed tomography device, which is at rest relative to the object under examination and relative to the surrounding area of the computed tomography device.

SUMMARY

One or more example embodiments provides an alternative to conventional solutions that relate to the execution of translation movements of gantry parts of a computed tomography device relative to one another. This object is achieved by each subject matter of an independent claim. Further advantageous aspects of one or more example embodiments of the present invention are taken into consideration in the dependent claims.

BRIEF DESCRIPTION OF THE DRAWINGS

The invention is described below using exemplary embodiments with reference to the attached figures. The representation in the figures is schematic, greatly simplified and not necessarily true to scale.

FIG. 9 shows a flow diagram of a method for executing translation movements of gantry parts of a computed tomography device according to one or more example embodiments.

DETAILED DESCRIPTION

Figure 1:
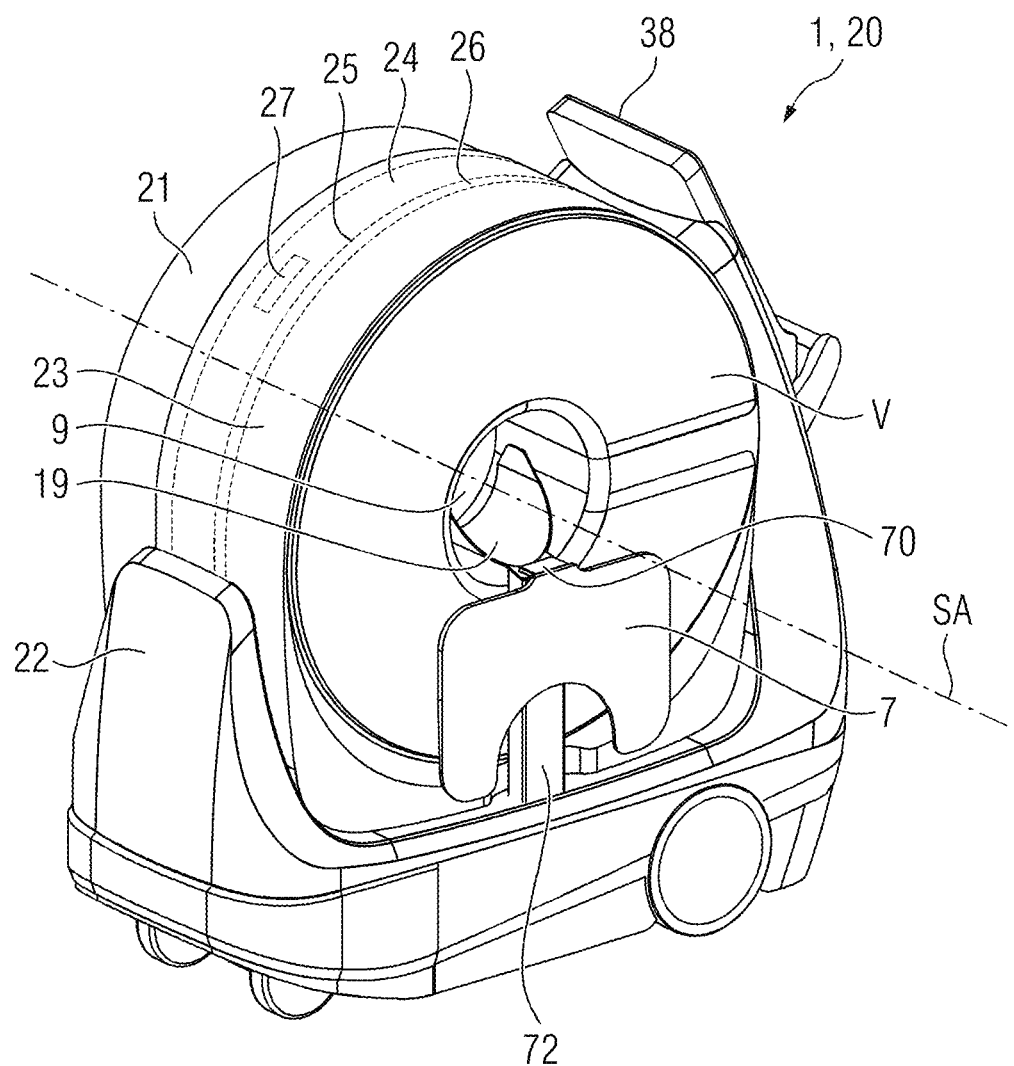
FIG. 1 shows a computed tomography device in the form of a mobile head computed tomography device with a head shell and a body support device according to one or more example embodiments.

One or more example embodiments of the present invention relates to a computed tomography device, having a gantry with a first gantry part, a second gantry part and a third gantry part, wherein the first gantry part has a rotor with a projection data acquisition system and via a first linear guide is mounted so that it can move relative to the second gantry part, such that a translation movement of the first gantry part relative to the second gantry part can be executed, in particular along the first linear guide, wherein the first gantry part has a first connection unit and the second gantry part has a second connection unit.

The third gantry part has a third connection unit which is designed to correspond to the first connection unit, such that via the first connection unit and the third connection unit a first connection can be created, which detachably fixes the third gantry part relative to the first gantry part, wherein the third gantry part follows the translation movement of the first gantry part relative to the second gantry part if the first connection is created.

The third gantry part has a fourth connection unit which is designed to correspond to the second connection unit, such that via the second connection unit and the fourth connection unit a second connection can be created which detachably fixes the third gantry part relative to the second gantry part, wherein during the translation movement of the first gantry part relative to the second gantry part the third gantry part is at rest relative to the second gantry part if the first connection is released and the second connection is created.

In particular it can be provided that during the translation movement of the first gantry part relative to the second gantry part the third gantry part is at rest relative to the first gantry part if the first connection is created.

The first linear guide can for example have a rail system and a trolley system which interacts with the rail system. In particular it can be provided that the first gantry part has the trolley system and/or that the second gantry part has the rail system. The gantry can for example further have a linear drive for driving the translation movement of the first gantry part relative to the second gantry part. The linear drive can for example have a threaded spindle and a screw drive which interacts with the threaded spindle. In particular it can be provided that the first gantry part has the screw drive and/or that the second gantry part has the threaded spindle.

One embodiment provides that the first connection is form-fit and/or that the second connection is force-fit. Due to a force-fit second connection the risk of jamming can be reduced compared to a form-fit second connection which is in principle also possible. In particular it can be provided that the second connection unit is located on a surface of the second gantry part and/or that the fourth connection unit is located on a surface of the third gantry part.

One embodiment provides that the second connection is based on a magnetic attraction between the second connection unit and the fourth connection unit. The second connection can for example be magnetic. By using a force-fit magnetic second connection the surface of the gantry in the region of the second connection unit and/or in the region of the fourth connection unit can be designed so as to be optimized for cleaning.

One embodiment provides that the second connection unit has an electromagnet and/or that the fourth connection unit has a ferromagnetic material. The fourth connection unit can for example have a ferromagnetic plate, for example made of steel. For example, the second connection can be created by activating the electromagnet, if the ferromagnetic material of the fourth connection unit is located within the effective range of the electromagnet. For example, the second connection can be released by deactivating the electromagnet.

One embodiment provides that the first connection unit has a bolt and an actuator for displacing the bolt and/or that the third connection unit is designed to receive the bolt in a form-fit manner. The first connection unit can for example be a lift cylinder, in particular in the form of an electric cylinder, pneumatic cylinder or hydraulic cylinder.

Thus no active components are necessary on the third gantry part to be able to create or release the first connection and the second connection. Thus for this purpose there is no requirement for control data and/or electrical energy to be transmitted to the third gantry part.

One embodiment provides that via a second linear guide the third gantry part is movably mounted relative to the first gantry part and/or that the second linear guide is aligned in parallel to the first linear guide.

One embodiment provides that the first connection is based on a lock which secures the third gantry part in a form-fit manner against a translation movement of the third gantry part along the second linear guide relative to the first gantry part.

One embodiment provides that the second linear guide has a set of parallel guide shafts and a set of ball bushings and/or that each guide shaft of the set of parallel guide shafts is mounted in a corresponding ball bushing of the set of ball bushings for a longitudinal movement of this guide shaft.

In particular it can be provided that the first gantry part has the set of ball bushings and that the third gantry part has the set of parallel guide shafts.

Alternatively, it can be provided that the third gantry part has the set of ball bushings and that the first gantry part has the set of parallel guide shafts. In principle it is also possible for the first gantry part to have a first guide shaft of the set of parallel guide shafts and a first ball bushing of the set of ball bushings and for the third gantry part to have a second guide shaft of the set of parallel guide shafts corresponding to the first ball bushing and a second ball bushing of the set of ball bushings corresponding to the first guide shaft.

As a result, whenever during the translation movement of the first gantry part relative to the second gantry part the third gantry part is at rest relative to the second gantry part, the friction between the third gantry part and the first gantry part can be reduced. In addition, whenever during the translation movement of the first gantry part relative to the second gantry part the third gantry part is at rest relative to the second gantry part, the weight of the third gantry part can be absorbed by the second gantry part substantially via the set of parallel guide shafts and the set of ball bushings, so that it is not necessary to design the second connection to hold a significant part of the weight of the third gantry part. In particular the electromagnet of the second connection unit can thus be designed to be less powerful.

As a result, a smooth and even run of the third gantry part relative to the first gantry part is enabled whenever during the translation movement of the first gantry part relative to the second gantry part the third gantry part is at rest relative to the second gantry part.

One embodiment provides that the third gantry part has at least one guide shaft of the set of parallel guide shafts, which has a notch for the form-fit reception of a correspondingly arranged bolt of the first connection unit. The at least one guide shaft of the set of parallel guide shafts can thus form the third connection unit. Thus it is not necessary to incorporate separate lock counter-pieces in addition to the guide shafts.

One embodiment provides that the gantry has an opening, wherein the opening is designed such that an object under examination can be introduced into the opening along a system axis of the gantry, and/or that the translation movement of the first gantry part relative to the second gantry part takes place along the system axis.

In particular it can be provided that the first linear guide is aligned in parallel to the system axis and/or that the second linear guide is aligned in parallel to the system axis. In particular it can be provided that each guide shaft of the set of parallel guide shafts is parallel to the system axis and/or that for each guide shaft of the set of parallel guide shafts the longitudinal movement of this guide shaft takes place along the system axis.

In particular it can be provided that the first gantry part is arranged substantially annularly around the system axis and/or that the third gantry part is arranged substantially annularly around the system axis.

In particular it can be provided that the parallel guide shafts of the set of parallel guide shafts are arranged around the system axis at a substantially uniform angular distance from one another in relation to the system axis. For example, three parallel guide shafts can be provided, which in each case have an angular distance of 120 degrees from one another in relation to the system axis.

In particular it can be provided that the first gantry part has a rotary bearing and a support structure and that the rotor is connected to the support structure via the rotary bearing and is mounted so as to be able to rotate about the system axis relative to the support structure.

The object under examination can for example be a body part, in particular a human or animal body part, or a phantom. The object under examination can in particular be a human head. The computed tomography device can in particular be designed as a head computed tomography device and/or as a mobile computed tomography device.

One embodiment provides that the first gantry part has a rear side of a casing of the gantry, wherein the rear side of the casing of the gantry annularly surrounds a rear side of the opening, and/or that the third gantry part has a front side of a casing of the gantry, wherein the front side of the casing of the gantry annularly surrounds a front side of the opening.

One embodiment provides that the fourth connection unit is fastened to the front side of the casing of the gantry. In particular it can be provided that the ferromagnetic plate of the fourth connection unit extends in a planar fashion substantially parallel to a surface of the front side of the casing of the gantry and/or that a plate plane of the ferromagnetic plate is substantially perpendicular, in particular perpendicular, to the system axis.

One or more example embodiments of the present invention further relates to a method for executing translation movements of gantry parts of an inventive computed tomography device, the method comprising:
   a creation of the first connection,
   a first execution of the translation movement of the first gantry part relative to the second gantry part in a first direction, wherein the third gantry part follows the translation movement of the first gantry part relative to the second gantry part,
   a first execution of the translation movement of the first gantry part relative to the second gantry part in a second direction, wherein the third gantry part follows the translation movement of the first gantry part relative to the second gantry part,
   a creation of the second connection,
   a release of the first connection,
   a second execution of the translation movement of the first gantry part relative to the second gantry part in the first direction, wherein the third gantry part is at rest relative to the second gantry part.

In particular the second direction can be opposite to the first direction. In particular it can be provided that the first direction is parallel to the system axis and/or that the second direction is parallel to the system axis.

In particular it can be provided that after the first execution of the translation movement of the first gantry part relative to the second gantry part in the first direction and prior to the first execution of the translation movement of the first gantry part relative to the second gantry part in the second direction an object under examination can be positioned relative to the gantry such that, due to the translation movement of the first gantry part relative to the second gantry part in the second direction the object under examination is introduced into the opening along the system axis of the gantry, wherein during the translation movement of the first gantry part relative to the second gantry part in the second direction the object under examination is at rest relative to the second gantry part.

In particular it can be provided that during the second execution of the translation movement of the first gantry part relative to the second gantry part in the first direction, projection data from an area under examination of the object under examination is captured via the projection data acquisition system.

One embodiment provides that the first connection unit has a bolt and an actuator to displace the bolt, wherein the third connection unit is designed for the form-fit reception of the bolt, wherein the first connection is created by the bolt being displaced via the actuator to the third connection unit and is received in a form-fit manner via the third connection unit, wherein the first connection is released by the bolt being displaced away from the third connection unit via the actuator.

The creation of the first connection can for example take place using a lock, which secures the third gantry part in a form-fit manner against a translation movement of the third gantry part along the second linear guide relative to the first gantry part. The release of the first connection can take place for example by an unlocking, which enables the translation movement of the third gantry part along the second linear guide relative to the first gantry part.

One embodiment provides that the second connection unit has an electromagnet, wherein the fourth connection unit has a ferromagnetic material, wherein due to the first execution of the translation movement of the first gantry part relative to the second gantry part in the second direction the ferromagnetic material of the fourth connection unit is brought into an effective range of the electromagnet, while the electromagnet is deactivated, wherein the second connection is created by activating the electromagnet.

The second connection can for example be released by deactivating the electromagnet. In particular it can be provided that, due to the first execution of the translation movement of the first gantry part relative to the second gantry part in the second direction, the fourth connection unit is drawn closer to the second connection unit as far as a form-fit stop. As a result, a jerky movement of the first gantry part on activation of the electromagnet and the associated risk for damage and/or crushing can be prevented.

In connection with one or more example embodiments of the present invention, features which are described in relation to different forms of embodiments of the invention and/or different claim categories (method, use, device, system, arrangement, etc.) can be combined to form further forms of embodiments of the invention. For example, a claim that relates to a device can also be developed with features that are described or claimed in connection with a method and vice versa. Functional features of a method can in this case be executed by correspondingly formed components covered by the subject matter. The use of the indefinite article "a" or "an" does not rule out that the feature in question may also be present multiple times.

FIG. 1 shows a computed tomography device 1 in the form of a mobile head computed tomography device with a head shell 19 and a shoulder board 7. The computed tomography device 1 has the gantry 20 with a first gantry part 21, a second gantry part 22 and a third gantry part 23, wherein the first gantry part 21 has a rotor 24 with a projection data acquisition system 27 and via a first linear guide is movably mounted relative to the second gantry part 22, such that a translation movement of the first gantry part 21 relative to the second gantry part 22 can be executed, in particular can be executed along the first linear guide.

The first gantry part 21 has a rotary bearing 25 and a support structure 26, wherein the rotor 24 is connected to the support structure 26 via the rotary bearing 25 and is rotatably mounted about the system axis SA relative to the support structure 26. The shoulder board 7 is connected to the retaining device 72 via the pivot device 70 and is pivotably mounted about a pivot axis perpendicular to the system axis SA relative to the gantry 20. The system axis SA is horizontal and parallel to the first direction Z1 and parallel to the second direction Z2. The second gantry part 22 has a chassis for a horizontal transport movement of the gantry 20. The gantry 20 further has the touch-sensitive screen 38 for operation of the computed tomography device 1.

The gantry 20 has an opening 9, wherein the opening 9 is designed such that an object under examination can be introduced into the opening 9 along a system axis SA of the gantry 20, wherein the translation movement of the first gantry part 21 relative to the second gantry part 22 takes place along the system axis SA. In particular it is provided that the first gantry part 21 is arranged substantially annularly around the system axis SA and/or that the third gantry part 23 is arranged substantially annularly around the system axis SA.

The first gantry part 21 has a rear side of a casing V of the gantry 20, wherein the rear side of the casing V of the gantry 20 annularly surrounds a rear side of the opening 9. The third gantry part 23 has a front side of a casing V of the gantry 20, wherein the front side of the casing V of the gantry 20 annularly surrounds a front side of the opening 9. The fourth connection unit C4 is fastened to the front side of the casing V of the gantry 20.

Figure 2:
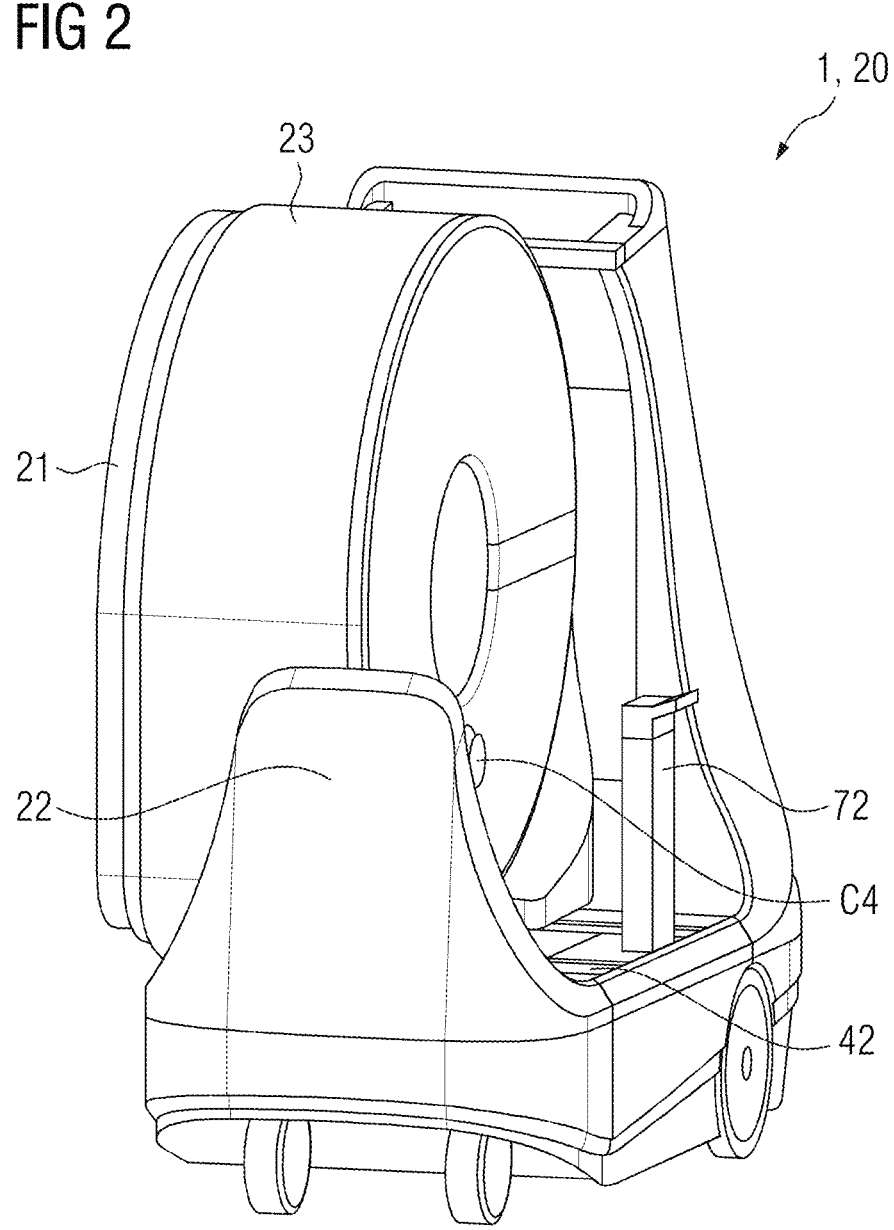
FIG. 2 shows a computed tomography device in a first operating state according to one or more example embodiments.

FIG. 2 shows a computed tomography device 1 in a first operating state. In the first operating state the first gantry part 21 and the third gantry part 23 are located at the rear end of the gantry 20. As a result, more space is available on the front side of the gantry 20 for positioning an object under examination.

Figure 3:
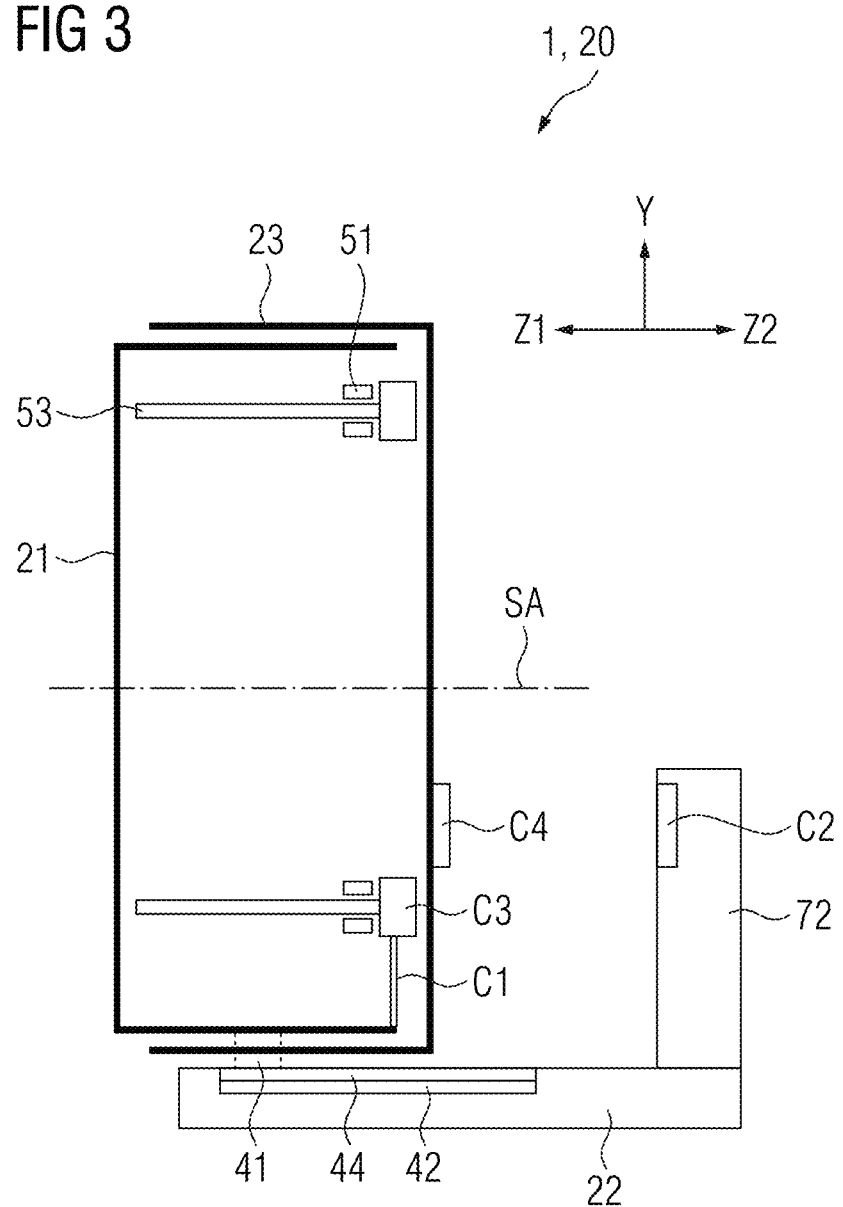
FIG. 3 shows a sectional view of the computed tomography device in the first operating state according to one or more example embodiments.

FIG. 3 shows a sectional view of the computed tomography device 1 in the first operating state. In the first operating state the first connection is created and the second connection is released, so that the third gantry part 23 follows the translation movement of the first gantry part 21 relative to the second gantry part 22 and in particular during the translation movement of the first gantry part 21 relative to the second gantry part 22 is at rest relative to the first gantry part 21. The first gantry part 21 has a first connection unit C1. The second gantry part 22 has a second connection unit C2.

The third gantry part 23 has a third connection unit C3, which is designed to correspond to the first connection unit C1, such that via the first connection unit C1 and the third connection unit C3 the first connection can be created, which detachably fixes the third gantry part 23 relative to the first gantry part 21, wherein the third gantry part 23 follows the translation movement of the first gantry part 21 relative to the second gantry part 22 if the first connection is created.

The third gantry part 23 has a fourth connection unit C4, which is designed to correspond to the second connection unit C2, such that via the second connection unit C2 and the fourth connection unit C4 the second connection can be created, which detachably fixes the third gantry part 23 relative to the second gantry part 22, wherein during the translation movement of the first gantry part 21 relative to the second gantry part 22 the third gantry part 23 is at rest relative to the second gantry part 22, if the first connection is released and the second connection is created.

The first linear guide can for example have a rail system 42 and a trolley system 41 which interacts with the rail system 42. In particular it can be provided that the first gantry part 21 has the trolley system 41 and/or that the second gantry part 22 has the rail system 42. The gantry 20 can for example further have a linear drive 44 for driving the translation movement of the first gantry part 21 relative to the second gantry part 22.

The second gantry part 22 has the retaining device 72. The shoulder board 72 and the second connection unit C2 can be fastened to the retaining device 72. The retaining device 72 extends along the vertical direction Y. As small as possible a distance of the second connection unit C2 and the fourth connection unit C4 from the system axis SA is advantageous, in order to reduce tilting of the third gantry part 23 if a tensile force is exerted on the third gantry part 23 via the second connection. The fourth connection unit C4 is located in relation to the system axis SA between the first gantry part 21 and the second connection unit C2. The front side of the casing V of the gantry 20 extends in a frontal plane which is substantially perpendicular to the system axis SA.

The third gantry part 23 is movably mounted via a second linear guide relative to the first gantry part 21, wherein the second linear guide is aligned in parallel to the first linear guide. The first connection is based on a lock, which secures the third gantry part 23 in a form-fit manner against a translation movement of the third gantry part 23 along the second linear guide relative to the first gantry part 21.

The second linear guide has a set of parallel guide shafts 53 and a set of ball bushings 51, wherein each guide shaft of the set of parallel guide shafts 53 is mounted in a corresponding ball bushing of the set of ball bushings 51 for a longitudinal movement of this guide shaft. In particular it is provided that the first gantry part 21 has the set of ball bushings 51 and that the third gantry part 23 has the set of parallel guide shafts 53.

In particular it is provided that the first linear guide is aligned in parallel to the system axis SA and/or that the second linear guide is aligned in parallel to the system axis SA. In particular it can be provided that each guide shaft of the set of parallel guide shafts 53 is parallel to the system axis SA and/or that for each guide shaft of the set of parallel guide shafts 53 the longitudinal movement of this guide shaft takes place along the system axis SA.

Figure 4:
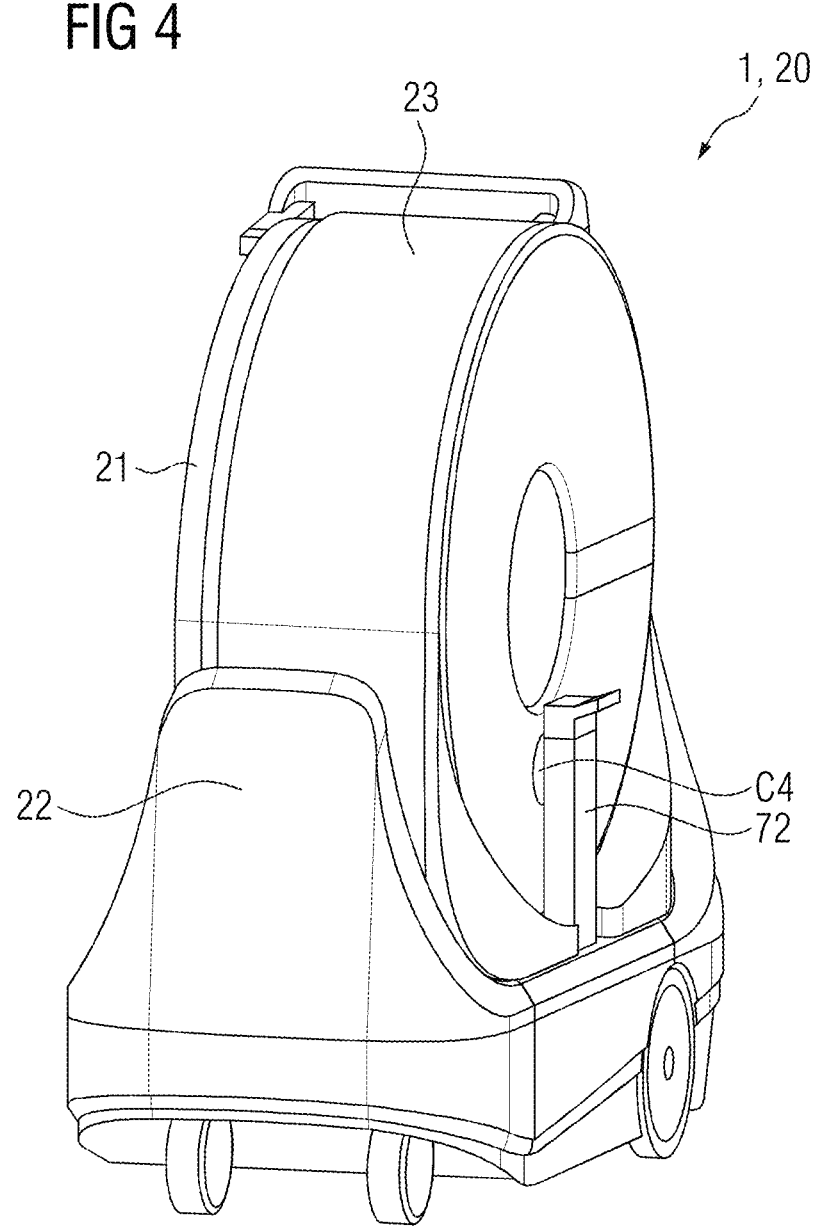
FIG. 4 shows the computed tomography device in a second operating state according to one or more example embodiments.

FIG. 4 shows the computed tomography device 1 in a second operating state. In the second operating state the first gantry part 21 and the third gantry part 23 are located at the front end of the gantry 20. As a result, the projection data acquisition system 27 is located in a starting position of a scanning movement.

Figure 5:
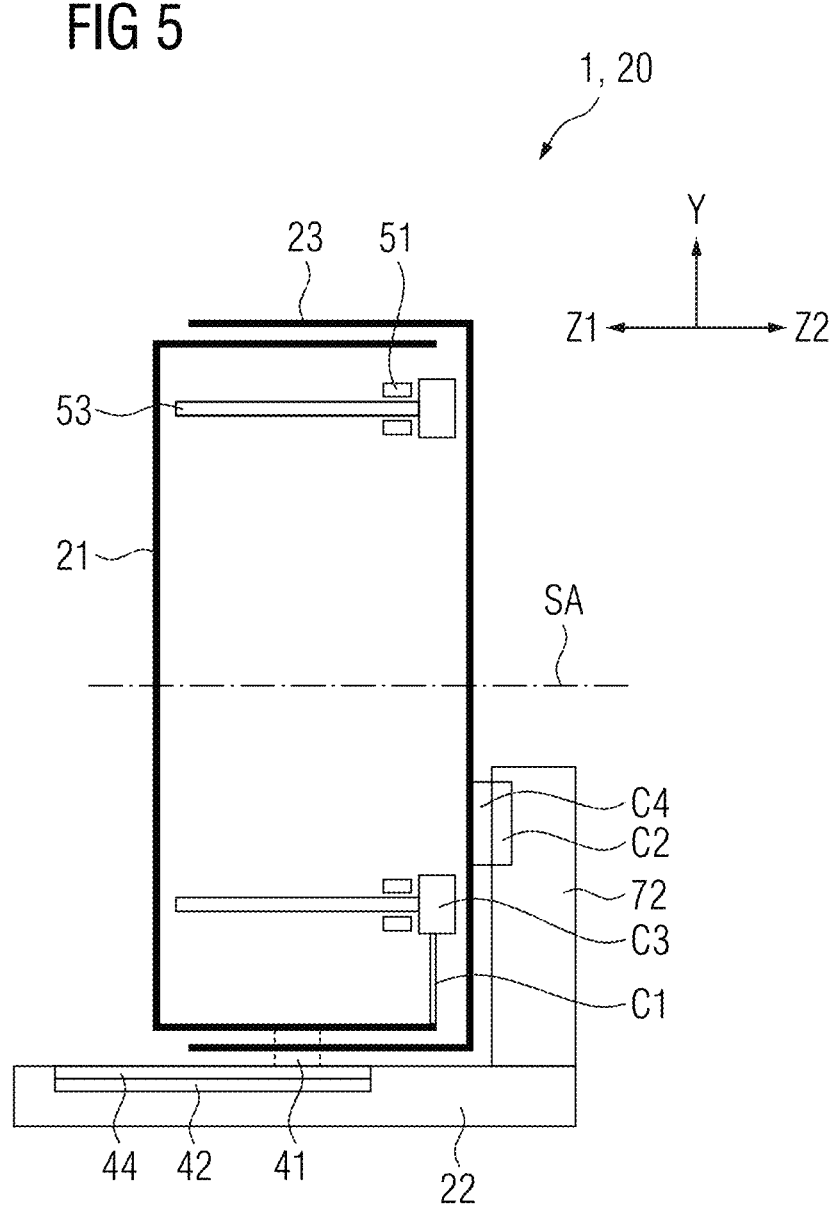
FIG. 5 shows a sectional view of the computed tomography device in an intermediate state according to one or more example embodiments.

FIG. 5 shows a sectional view of the computed tomography device 1 in an intermediate state. In the intermediate state the first connection is created and the second connection is created. The computed tomography device 1 is thus located between the first operating state and the second operating state.

Figure 6:
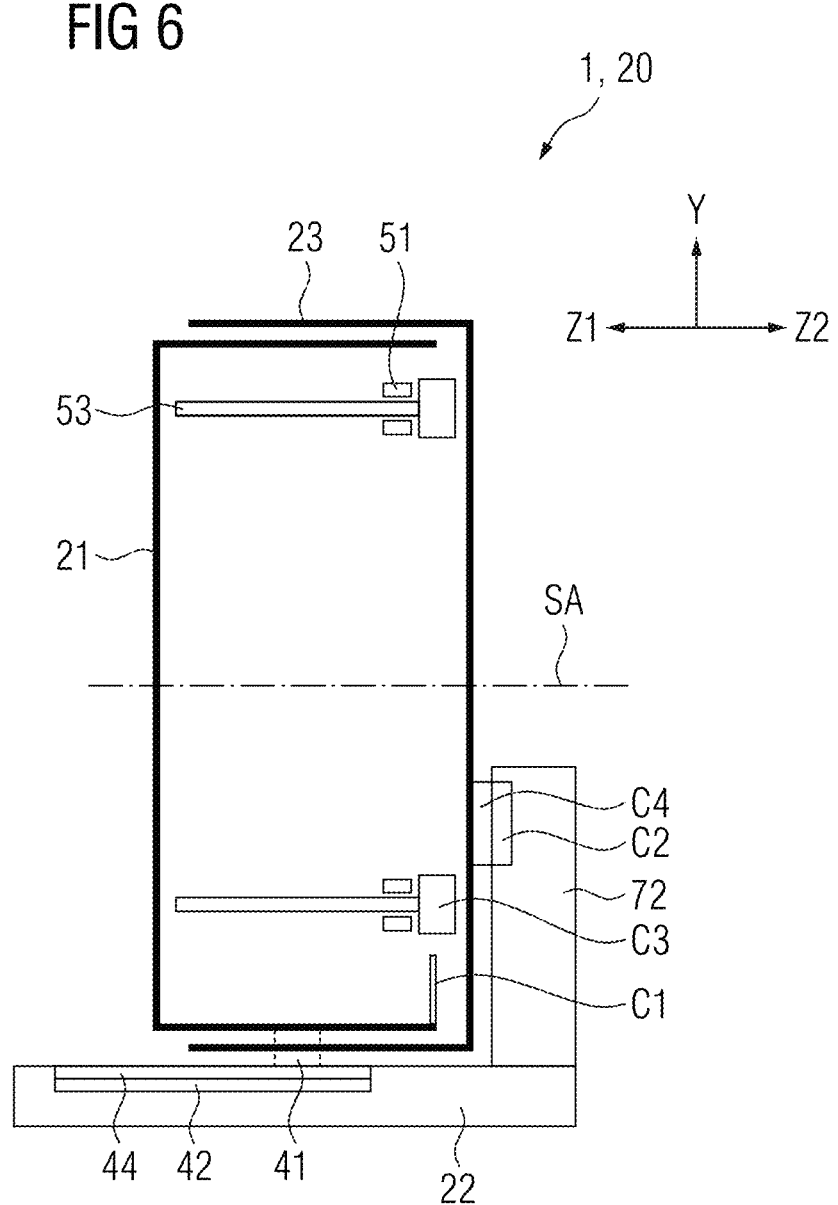
FIG. 6 shows a sectional view of the computed tomography device in the second operating state according to one or more example embodiments.

FIG. 6 shows a sectional view of the computed tomography device 1 in the second operating state. In the second operating state the first connection is released and the second connection is created, so that during the translation movement of the first gantry part 21 relative to the second gantry part 22 the third gantry part 23 is at rest relative to the second gantry part 22.

Figure 7:
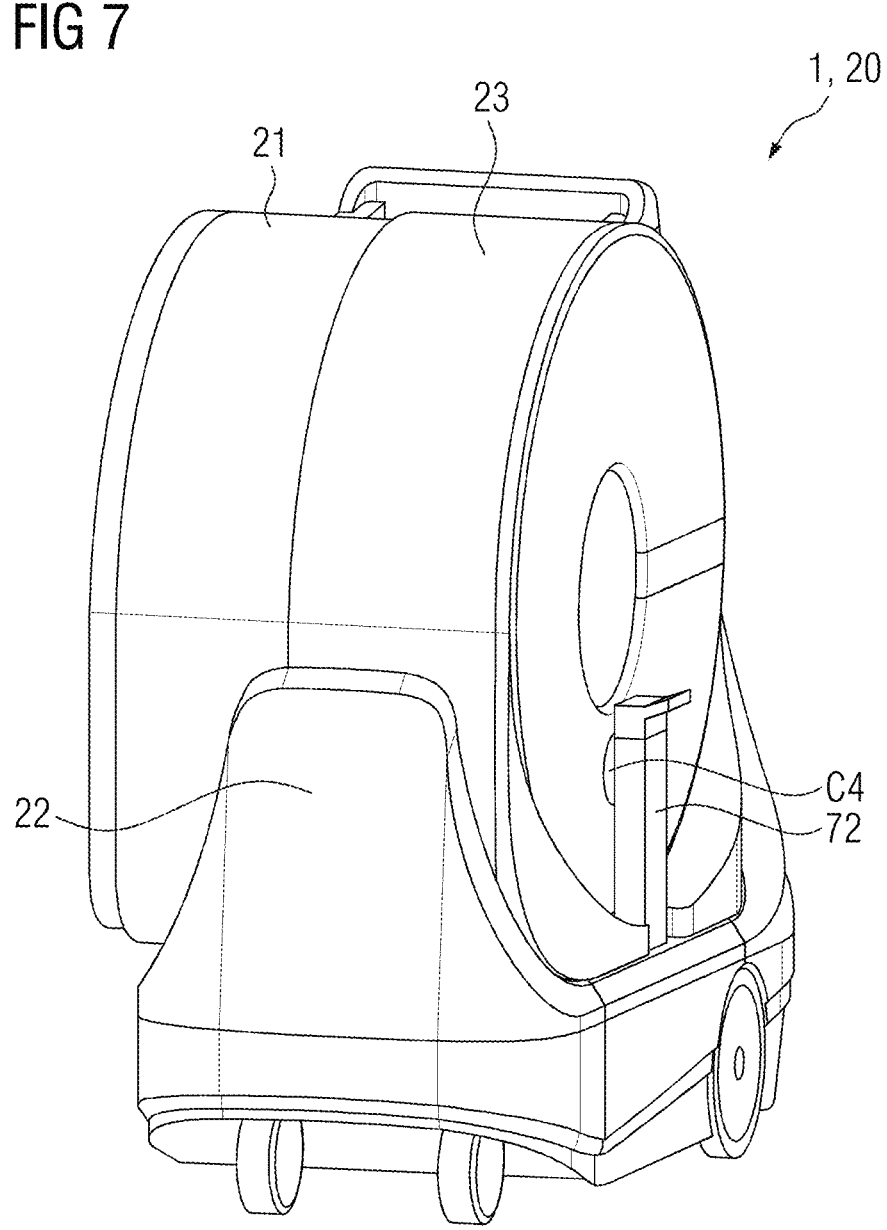
FIG. 7 shows the computed tomography device in a third operating state according to one or more example embodiments.

FIG. 7 shows the computed tomography device 1 in a third operating state. In the third operating state the first gantry part 21 is located at the rear end of the gantry 20 and the third gantry part 23 at the front end of the gantry 20.

Figure 8:
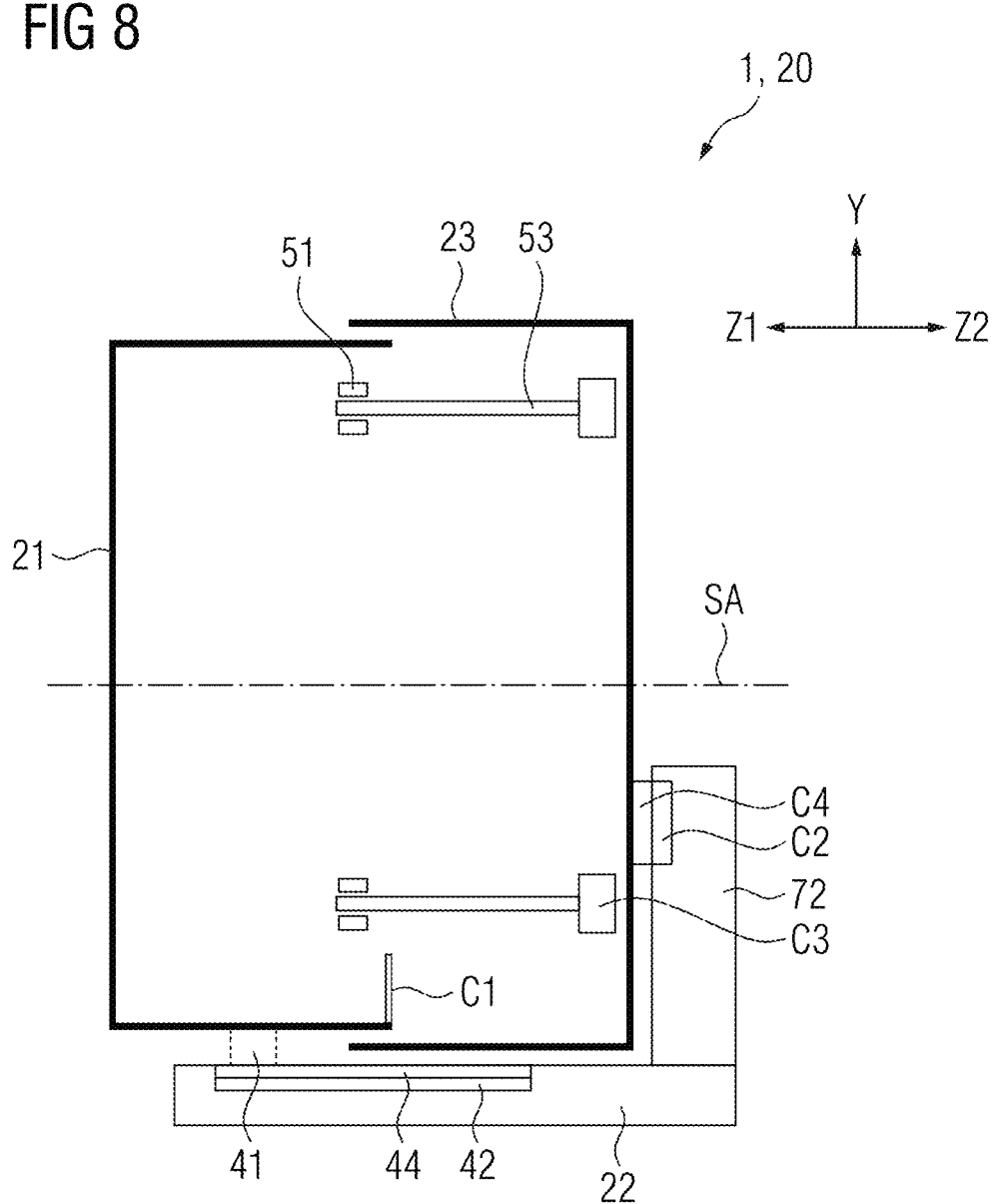
FIG. 8 shows a sectional view of the computed tomography device in the third operating state according to one or more example embodiments.

FIG. 8 shows a sectional view of the computed tomography device 1 in the third operating state. In the third operating state the first connection is released and the second connection is created, so that during the translation movement of the first gantry part 21 relative to the second gantry part 22 the third gantry part 23 is at rest relative to the second gantry part 22.

FIG. 9 shows a flow diagram of a method for executing translation movements of gantry parts of a computed tomography device 1, the method comprising:

a creation M1 of the first connection, a first execution M2 of the translation movement of the first gantry part 21 relative to the second gantry part 22 in a first direction Z1, wherein the third gantry part 23 follows the translation movement of the first gantry part 21 relative to the second gantry part 22, a first execution M3 of the translation movement of the first gantry part 21 relative to the second gantry part 22 in a second direction Z2, wherein the third gantry part 23 follows the translation movement of the first gantry part 21 relative to the second gantry part 22, a creation M4 of the second connection, a release M5 of the first connection, a second execution M6 of the translation movement of the first gantry part 21 relative to the second gantry part 22 in the first direction Z1, wherein the third gantry part 23 is at rest relative to the second gantry part 22.

In particular the second direction Z2 can be opposite to the first direction Z1. In particular it can be provided that the first direction Z1 is parallel to the system axis SA and/or that the second direction Z2 is parallel to the system axis SA.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The expression "a number of" means "at least one". The mention of a "unit" or a "device" does not preclude the use of more than one unit or device. The expression "a number of" has to be understood as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A computed tomography device comprising:
a gantry including a first gantry part, a second gantry part and a third gantry part,
the first gantry part including,
a rotor with a projection data acquisition system, the first gantry part being movably mounted via a first linear guide relative to the second gantry part such that a translation movement of the first gantry part relative to the second gantry part can be executed, and
a first connection unit,
the second gantry part including a second connection unit,
the third gantry part including,
a third connection unit configured to correspond to the first connection unit, such that via the first connection unit and the third connection unit a first connection is created, the first connection detachably fixing the third gantry part relative to the first gantry part, wherein the third gantry part follows the translation movement of the first gantry part relative to the second gantry part if the first connection is created, and
a fourth connection unit configured to correspond to the second connection unit, such that via the second connection unit and the fourth connection unit a second connection is created, the second connection detachably fixing the third gantry part relative to the second gantry part, wherein during the translation movement of the first gantry part relative to the second gantry part the third gantry part is at rest relative to the second gantry part if the first connection is released and the second connection is created.

2. The computed tomography device of claim 1, wherein at least one of
the first connection is form-fit, or
the second connection is force-fit.

3. The computed tomography device of claim 2, wherein the second connection is based on a magnetic attraction between the second connection unit and the fourth connection unit.

4. The computed tomography device of claim 3, wherein the second connection unit includes an electromagnet, and the fourth connection unit includes a ferromagnetic material.

5. The computed tomography device of claim 4, wherein the first connection unit includes a bolt and an actuator for displacing the bolt, and the third connection unit is configured for the form-fit reception of the bolt.

6. The computed tomography device of claim 5, wherein the third gantry part is movably mounted relative to the first gantry part via a second linear guide, and the second linear guide is aligned in parallel to the first linear guide.

7. The computed tomography device of claim 6, wherein the first connection is based on a lock, which secures the third gantry part in a form-fit manner against a translation movement of the third gantry part along the second linear guide relative to the first gantry part.

8. The computed tomography device of claim 1, wherein the second connection is based on a magnetic attraction between the second connection unit and the fourth connection unit.

9. The computed tomography device of claim 1, wherein the second connection unit includes an electromagnet, and the fourth connection unit includes a ferromagnetic material.

10. The computed tomography device of claim 1, wherein the first connection unit includes a bolt and an actuator for displacing the bolt, and the third connection unit is configured for a form-fit reception of the bolt.

11. The computed tomography device of claim 1, wherein the third gantry part is movably mounted relative to the first gantry part via a second linear guide, and the second linear guide is aligned in parallel to the first linear guide.

12. The computed tomography device of claim 11, wherein the first connection is based on a lock, which secures the third gantry part in a form-fit manner against a translation movement of the third gantry part along the second linear guide relative to the first gantry part.

13. The computed tomography device of claim 11, wherein the second linear guide includes a set of parallel guide shafts and a set of ball bushings, and each guide shaft of the set of parallel guide shafts is mounted in a corresponding ball bushing of the set of ball bushings for a longitudinal movement of this guide shaft.

14. The computed tomography device of claim 13, wherein the third gantry part includes at least one guide shaft of the set of parallel guide shafts, which includes a notch for a form-fit reception of a correspondingly arranged bolt of the first connection unit.

15. The computed tomography device of claim 1, wherein the gantry includes an opening, the opening is configured such that an object under examination can be introduced into the opening along a system axis of the gantry, and the translation movement of the first gantry part relative to the second gantry part takes place along the system axis.

16. The computed tomography device of claim 15, wherein the first gantry part includes a rear side of a casing of the gantry, the rear side of the casing of the gantry annularly surrounds a rear side of the opening, and the third gantry part includes a front side of a casing of the gantry, and the front side of the casing of the gantry annularly surrounds a front side of the opening.

17. The computed tomography device of claim 16, wherein the fourth connection unit is fastened to the front side of the casing of the gantry.

18. A method for executing translation movements of the computed tomography device of claim 1, the method comprising:
creating the first connection;
executing the translation movement of the first gantry part relative to the second gantry part in a first direction, the third gantry part following the translation movement of the first gantry part relative to the second gantry part;
executing the translation movement of the first gantry part relative to the second gantry part in a second direction, the third gantry part following the translation movement of the first gantry part relative to the second gantry part;

creating the second connection;

releasing the first connection; and executing the translation movement of the first gantry part relative to the second gantry part in the first direction, the third gantry part being at rest relative to the second gantry part.

19. The method of claim 18, wherein the first connection unit includes a bolt and an actuator for displacing the bolt, the third connection unit is configured for a form-fit reception of the bolt, the first connection is created by the bolt being displaced via the actuator to the third connection unit and is received in a form-fit manner via the third connection unit, and the first connection is released by the bolt being displaced away from the third connection unit via the actuator.

20. The method of claim 18, wherein the second connection unit includes an electromagnet, the fourth connection unit includes a ferromagnetic material, due to the execution of the translation movement of the first gantry part relative to the second gantry part in the second direction, the ferromagnetic material of the fourth connection unit is brought within an effective range of the electromagnet, while the electromagnet is deactivated, and the second connection is created by the electromagnet being activated.

* * * * *